(12) United States Patent
Zhang

(10) Patent No.: US 11,609,461 B2
(45) Date of Patent: Mar. 21, 2023

(54) DISPLAY AND METHOD OF MANUFACTURING SAME

(71) Applicant: TCL China Star Optoelectronics Technology Co., Ltd., Shenzhen (CN)

(72) Inventor: Yu Zhang, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/620,491

(22) PCT Filed: Sep. 16, 2019

(86) PCT No.: PCT/CN2019/105972
§ 371 (c)(1),
(2) Date: Dec. 7, 2019

(87) PCT Pub. No.: WO2020/244088
PCT Pub. Date: Dec. 10, 2020

(65) Prior Publication Data
US 2022/0334439 A1    Oct. 20, 2022

(30) Foreign Application Priority Data

Jun. 5, 2019    (CN) .......................... 201910484223.2

(51) Int. Cl.
*G02F 1/1362* (2006.01)
*G02B 1/00* (2006.01)
*G02F 1/1368* (2006.01)

(52) U.S. Cl.
CPC ....... *G02F 1/136209* (2013.01); *G02B 1/005* (2013.01); *G02F 1/1368* (2013.01)

(58) Field of Classification Search
CPC ....... G02B 1/005; G02B 5/003; G02F 1/1368; G02F 1/133509; G02F 1/133512; G02F 1/136209; G02F 1/1351
See application file for complete search history.

(56) References Cited

U.S. PATENT DOCUMENTS

| 2004/0227874 | A1 | 11/2004 | Kim et al. | |
| 2008/0160433 | A1 | 7/2008 | Yang et al. | |
| 2009/0212265 | A1* | 8/2009 | Steinhardt | C08G 65/22 252/501.1 |
| 2010/0253605 | A1 | 10/2010 | Inada | |
| 2016/0096233 | A1* | 4/2016 | Duan | B23K 26/0624 219/121.79 |
| 2019/0056618 | A1 | 2/2019 | Xu | |

(Continued)

FOREIGN PATENT DOCUMENTS

| CN | 101859507 A | 10/2010 |
| CN | 101872081 A | 10/2010 |
| CN | 102320553 A | 1/2012 |

(Continued)

*Primary Examiner* — Mariam Qureshi
(74) *Attorney, Agent, or Firm* — PV IP PC; Wei Te Chung; Ude Lu

(57) ABSTRACT

The present invention provides a display and a method of manufacturing the same, the display including: a first substrate; a first black matrix disposed on the first substrate; a second substrate disposed on the first black matrix; and a second black matrix disposed between the second substrate and the first black matrix, wherein the second black matrix has a photonic crystal structure.

7 Claims, 2 Drawing Sheets

(56) References Cited

U.S. PATENT DOCUMENTS

2019/0129238 A1* 5/2019 Wang ................ G02F 1/136209
2020/0033671 A1* 1/2020 Wang ................ G02F 1/133617

FOREIGN PATENT DOCUMENTS

| CN | 103984211 A | 8/2014 |
| CN | 107255885 A | 10/2017 |
| CN | 107632453 A | 1/2018 |

* cited by examiner

DISPLAY AND METHOD OF MANUFACTURING SAME

BACKGROUND OF INVENTION

Field of Invention

The present invention relates to a field of displays, and particularly to a liquid crystal display with low reflectivity and a method of manufacturing the same.

Description of Prior Art

With advent of the information age, display devices are everywhere. However, the reflective problem of the glass seriously impacts the user's experience, which negatively affects sharpness and color quality that the user sees. Therefore, development of low-reflectivity screens is imperative and has great market value.

When ambient light is incident on a surface of a display screen, since there is a large difference between refractive index of air and refractive index of each layer of the screen, the light is reflected in a manner similar to specular reflection. One of the common methods of current low-reflectivity technology is reducing the difference in refractive index between layers. In addition, the black matrix (BM) is specially designed to produce a display screen with low reflectivity.

Photonic crystals are a class of artificially designed and manufactured crystals having a periodic dielectric structure on an optical scale. It can selectively allow light in a certain waveband to pass and prevent light of other wavelengths from passing through. The special absorption of light by the photonic crystals can contribute to the design of low reflectivity screens. However, most of the photonic crystal structures are currently used in microwave signal equipment, and applications on display technologies with low reflectivity are few.

In order to solve the reflection influence of the display on the user's experience, the present invention proposes a liquid crystal display panel employing a photonic crystal structure to realize low reflection.

SUMMARY OF INVENTION

In view of this, the present invention provides a novel display, wherein a two-photon laser direct writing technique is employed to construct a micro-cell, thereby constructing a small-sized black matrix (BM) having a photonic crystal structure, which can absorb ambient light, and consuming ambient light in its complex cell structure, greatly reducing the specular reflection of light on the screen surface in an environment. In addition, a common black matrix of a non-photonic crystal structure is introduced to effectively reduce the reflectivity of the display without compromising the contrast, and the manufacture of the display can be completed without etching the glass.

According to an embodiment of the present invention, the present invention provides a display including: a first substrate; a first black matrix disposed on the first substrate; a second substrate disposed on the first black matrix; a second black matrix disposed between the second substrate and the first black matrix, wherein the second black matrix has a photonic crystal structure.

According to an embodiment of the present invention, the present invention also provides a method of manufacturing a display, including the steps of: S10 providing a first substrate; S20 forming a first black matrix on the first substrate; S30 providing a second substrate on the first black matrix; S40 forming a second black matrix between the second substrate and the first black matrix, wherein the second black matrix has a photonic crystal structure, and the photonic crystal structure is a periodic dielectric structure.

In an embodiment of the present invention, the step S40 includes: S41 coating a positive photoresist on the second substrate; S42 pumping laser into the positive photoresist by a two-photon direct writing technique to form the photonic crystal structure; and S43 removing unreacted positive photoresist to obtain the second black matrix.

In an embodiment of the present invention, the positive photoresist includes a liquid crystal molecule doped with a monomer of photosensitive polymer.

In an embodiment of the present invention, in the step 42, the laser is pumped into the positive photoresist to cause polymerization of the monomer of the photosensitive polymer of the positive photoresist, which fixes the liquid crystal original translation 2 molecule to form the photonic crystal structure, wherein the two-photon direct writing technique is used to adjust a size of the photonic crystal structure such that the photonic crystal structure has nano-scaled or micron-scaled structure of a predetermined size.

In an embodiment of the present invention, in the step 43, a method of removing the unreacted positive photoresist includes cleaning the photonic crystal structure with a developer.

In an embodiment of the present invention, the first substrate includes an array of transistors.

In an embodiment of the present invention, the photonic crystal structure is a periodic dielectric structure.

The present invention provides a novel display, wherein a two-photon laser direct writing technique is employed to construct a micro-cell, thereby constructing a small-sized black matrix (BM) having a photonic crystal structure, which can absorb ambient light, and consuming ambient light in its complex cell structure, greatly reducing the specular reflection of light on the screen surface in an environment. In addition, a common black matrix of a non-photonic crystal structure is introduced to effectively reduce the reflectivity of the display without compromising the contrast, and the manufacture of the display can be completed without etching the glass.

BRIEF DESCRIPTION OF DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

DETAILED DESCRIPTION OF PREFERRED EMBODIMENTS

In order to make the above description of the present invention more comprehensible, the preferred embodiments are described below in detail with reference to the accompanying drawings.

The following description of the various embodiments is provided to illustrate the specific embodiments of the invention. The spatially relative directional terms mentioned in the present invention, such as "vertical", "horizontal", "upper", "lower", "before", "after", "left", "right", "inside", "outside", "side", etc. and the like, may be used herein for ease of description to describe one element or feature's relationship to another element(s) or feature(s) as illustrated in the figures which are merely references. The spatially relative terms are intended to encompass different orientations in addition to the orientation as depicted in the figures.

Furthermore, the terms "first", "second", etc. in the specification and claims of the present invention and the above figures are used to distinguish similar objects, and are not necessarily used to describe a specific order or prioritization. It should be understood that the objects so described are interchangeable when it is appropriate. Moreover, the terms "including" and "having" and any variations thereof are intended to cover a non-exclusive "inclusion".

In order to solve the problems of the prior art, the present invention provides a novel display, wherein a two-photon laser direct writing technique is employed to construct a micro-cell, thereby constructing a small-sized black matrix (BM) having a photonic crystal structure, which can absorb ambient light, and consuming ambient light in its complex cell structure, greatly reducing the specular reflection of light on the screen surface in an environment. In addition, a common black matrix of a non-photonic crystal structure is introduced to effectively reduce the reflectivity of the display without compromising the contrast, and the manufacture of the display can be completed without etching the glass.

Figure 1:
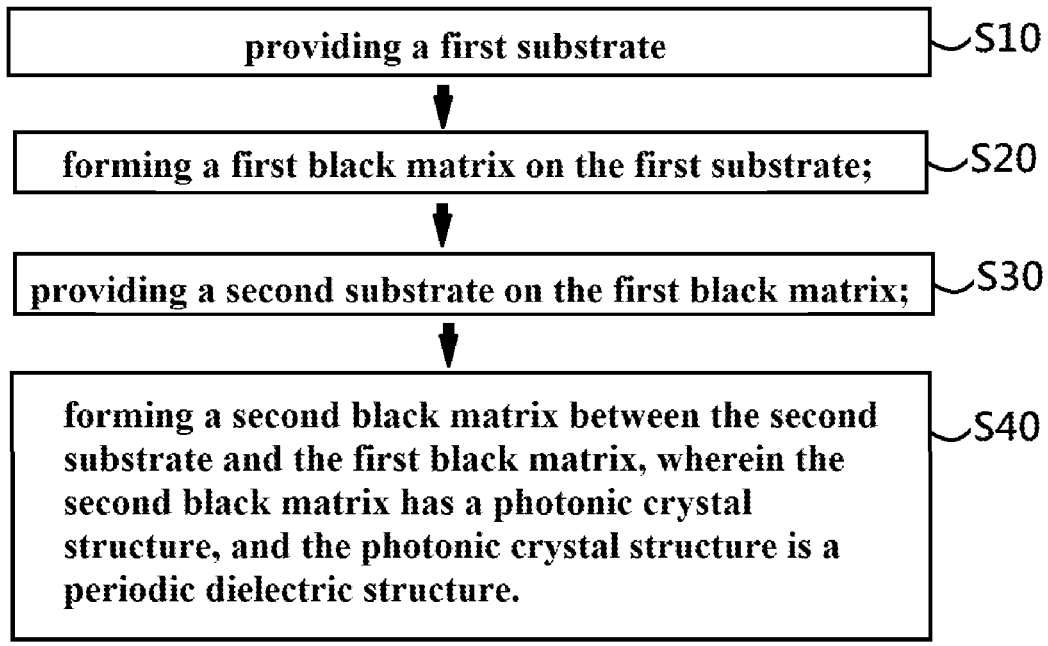
FIG. 1 is a flow chart of a method of manufacturing a display in accordance with an embodiment of the present invention.
Figure 2:
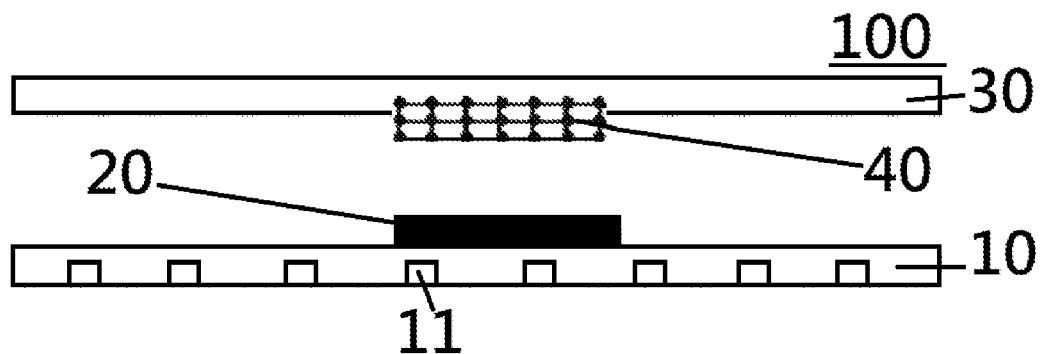
FIG. 2 is a schematic diagram of a display in accordance with an embodiment of the present invention.
Figure 3:
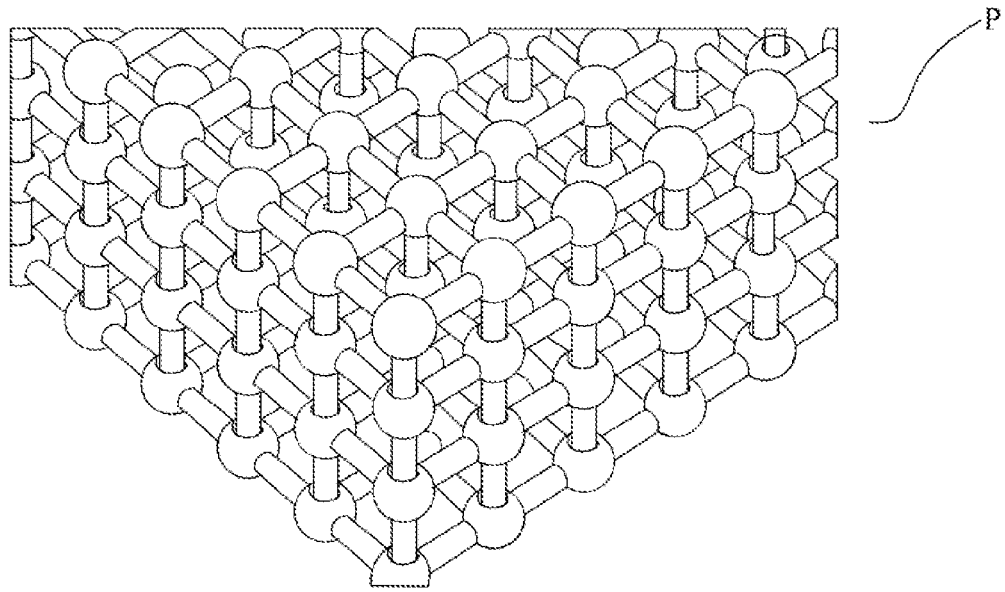
FIG. 3 is a schematic diagram of a photonic crystal structure in accordance with an embodiment of the present invention.

FIG. 1 is a flow chart of a method of manufacturing a display in accordance with an embodiment of the present invention. FIG. 2 is a schematic diagram of a display in accordance with an embodiment of the present invention. FIG. 3 is a schematic diagram of a photonic crystal structure in accordance with an embodiment of the present invention. Referring to FIG. 1 to FIG. 3, specifically, the method of manufacturing the display of the present invention includes the following steps:

S10 providing a first substrate 10;

S20 forming a first black matrix 20 on the first substrate 10;

S30 providing a second substrate 30 on the first black matrix 20;

S40 forming a second black matrix 40 between the second substrate 30 and the first black matrix 20, wherein the second black matrix 40 has a photonic crystal structure P, and the photonic crystal structure P is a periodic dielectric structure, as shown in FIG. 3.

Figure 4:
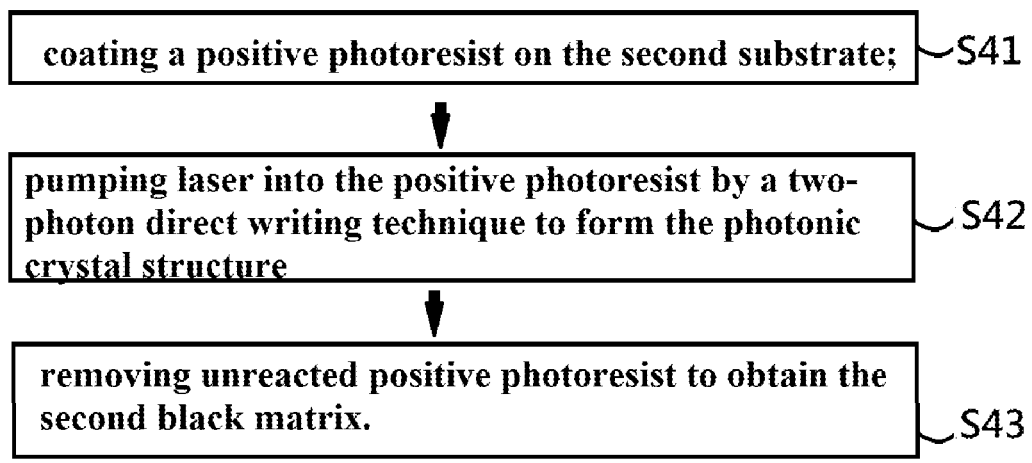
FIG. 4 is a flow chart showing the step S40 in the method of manufacturing the display in accordance with an embodiment of the present invention.

FIG. 4 is a flow chart showing the step S40 in the method of manufacturing the display in accordance with an embodiment of the present invention. Referring to FIG. 4, specifically, in an embodiment of the present invention, the step S40 includes:

S41 coating a positive photoresist on the second substrate 30;

S42 pumping laser into the positive photoresist by a two-photon direct writing technique to form the photonic crystal structure P; and S43 removing unreacted positive photoresist to obtain the second black matrix 40.

In an embodiment of the present invention, the positive photoresist includes a liquid crystal molecule doped with a monomer of photosensitive polymer.

In an embodiment of the present invention, in the step 42, the laser is pumped into the positive photoresist to cause polymerization of the monomer of the photosensitive polymer of the positive photoresist, which fixes the liquid crystal molecule to form the photonic crystal structure P, as shown in FIG. 3. In an embodiment of the present invention, the two-photon direct writing technique is used to adjust a size of the photonic crystal structure such that the photonic crystal structure has nano-scaled or micron-scaled structure of a predetermined size according to actual needs.

In an embodiment of the present invention, in the step 43, a method of removing the unreacted positive photoresist includes cleaning the photonic crystal structure with a developer, as shown in FIG. 3.

The display 100 manufactured according to an embodiment of the present invention includes: a first substrate 10; a first black matrix 20 disposed on the first substrate 10; a second substrate 30 disposed on the first substrate a black matrix 20; and a second black matrix 40 disposed between the second substrate 30 and the first black matrix 20, wherein the second black matrix 40 has a photonic crystal structure P, and the photonic crystal structure P is a periodic dielectric structure.

In an embodiment of the invention, the first substrate 10 includes a transistor array 11.

In the method of manufacturing the display of the present invention, the two-photon technology can adjust the size of the photonic crystal from nanometer to micrometer, so that the photonic crystal can be adjusted according to actual needs. By coating a positive black matrix photoresist on a side of an upper plate exposed to the ambient light, after pumping the two-photon laser, the photonic crystal structure can be retained, and the remaining photoresist is cleaned by the developer to obtain a black matrix having a photonic crystal structure. The black matrix is constructed on the opposite side by a traditional method referred to as BOA (black matrix on array), that is, the black matrix is built on a side where the transistor array is disposed, and the photoresist material is integrated into the same side of the transistor array. The black matrix having the photonic crystal structure on the upper plate will specifically absorb the ambient light, and will consume the energy of the light, which will reduce the specular reflection of the ambient light on the surface.

Accordingly, the present invention provides a novel display, wherein a two-photon laser direct writing technique is employed to construct a micro-cell, thereby constructing a small-sized black matrix (BM) having a photonic crystal structure, which can absorb ambient light, and consuming ambient light in its complex cell structure, greatly reducing the specular reflection of light on the screen surface in an environment. In addition, a common black matrix of a non-photonic crystal structure is introduced to effectively reduce the reflectivity of the display without compromising the contrast, and the manufacture of the display can be completed without etching the glass.

While the invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A method of manufacturing a display, comprising steps of:
   S10 providing a first substrate;
   S20 forming a first black matrix on the first substrate;
   S30 providing a second substrate on the first black matrix;
   S40 forming a second black matrix between the second substrate and the first black matrix, wherein the second black matrix has a photonic crystal structure, and the photonic crystal structure is a periodic dielectric structure, and the step S40 comprises:
   S41 coating a positive photoresist on the second substrate;
   S42 pumping laser into the positive photoresist by a two-photon direct writing technique to form the photonic crystal structure;
   S43 removing an unreacted positive photoresist to obtain the second black matrix;
   wherein the positive photoresist comprises a liquid crystal molecule doped with monomer of a photosensitive polymer.

2. The method of manufacturing the display according to claim 1, wherein in the step S43, the method of removing the unreacted positive photoresist comprises cleaning the photonic crystal structure with a developer.

3. The method of manufacturing the display according to claim 1, wherein the first substrate comprises an array of transistors.

4. A method of manufacturing a display, comprising the steps of:
   S10 providing a first substrate;
   S20 forming a first black matrix on the first substrate;
   S30 providing a second substrate on the first black matrix;
   S40 forming a second black matrix between the second substrate and the first black matrix, wherein the second black matrix has a photonic crystal structure, and the photonic crystal structure is a periodic dielectric structure;
   wherein the step S40 comprises:
   S41 coating a positive photoresist on the second substrate;
   S42 pumping laser into the positive photoresist by a two-photon direct writing technique to form the photonic crystal structure; and
   S43 removing unreacted positive photoresist to obtain the second black matrix;
   wherein the positive photoresist comprises a liquid crystal molecule doped with a photosensitive polymer monomer;
   wherein in the step 42, the laser is pumped into the positive photoresist to cause polymerization of the photosensitive polymer monomer of the positive photoresist, which fixes the liquid crystal molecule to form the photonic crystal structure, wherein the two-photon direct writing technique is used to adjust a size of the photonic crystal structure such that the photonic crystal structure has nano-scaled or micron-scaled structure of a predetermined size.

5. The method of manufacturing the display according to claim 4, wherein in the step 43, a method of removing the unreacted positive photoresist comprises cleaning the photonic crystal structure with a developer.

6. The method of manufacturing the display according to claim 4, wherein the first substrate comprises an array of transistors.

7. A method of fabricating a display according to claim 4, wherein the photonic crystal structure is a periodic dielectric structure.

* * * * *